(12) United States Patent
Davison (10) Patent No.: US 8,628,091 B2
(45) Date of Patent: Jan. 14, 2014

(54) VAPOR SEAL ASSEMBLY AND METHOD FOR INSTALLING

(75) Inventor: John E. Davison, Arlington, WA (US)

(73) Assignee: The Boeing Company, Chicago, IL (US)

( * ) Notice: Subject to any disclaimer, the term of this patent is extended or adjusted under 35 U.S.C. 154(b) by 901 days.

(21) Appl. No.: 12/207,524

(22) Filed: Sep. 10, 2008

(65) Prior Publication Data
US 2010/0059939 A1 Mar. 11, 2010

(51) Int. Cl.
*F16L 17/00* (2006.01)

(52) U.S. Cl.
USPC .......................................... 277/314; 277/637

(58) Field of Classification Search
USPC ......... 277/603, 616, 315, 585, 607, 619–621, 277/623–625, 312, 314, 637; 411/539–541, 411/433; 174/65, 650–664, 72 A
See application file for complete search history.

(56) References Cited

U.S. PATENT DOCUMENTS

| | | | |
|---|---|---|---|
| 3,605,076 A | 9/1971 | Dozier | |
| 4,274,323 A * | 6/1981 | Resnicow | 411/433 |
| 4,462,731 A * | 7/1984 | Rovinsky et al. | 411/433 |
| 4,836,558 A | 6/1989 | Anderson et al. | |
| 4,923,349 A * | 5/1990 | Logsdon | 411/433 |
| 5,139,381 A | 8/1992 | Lubreski et al. | |
| 5,510,577 A | 4/1996 | Corrigan | |
| 5,664,810 A | 9/1997 | Zielinski | |
| 5,803,763 A | 9/1998 | Grant | |
| 5,831,217 A | 11/1998 | Jarvis et al. | |
| 6,180,882 B1 * | 1/2001 | Dinh | 174/655 |
| 6,474,879 B1 | 11/2002 | Warnes et al. | |
| 6,521,840 B1 * | 2/2003 | Kreutz | 174/151 |
| 6,713,672 B1 * | 3/2004 | Stickney | 174/382 |
| 6,827,310 B1 * | 12/2004 | Whitham | 244/3.24 |
| 6,935,890 B1 * | 8/2005 | Gretz | 439/552 |

OTHER PUBLICATIONS

WikiProducts Article on Cinch Connectors dated May 20, 2009; 9 pages.
Cinch Service Bulletin, CN1036-28-01, Revision C, dated Jan. 18, 2007; 26 pages.

* cited by examiner

*Primary Examiner* — Jennifer H Gay
*Assistant Examiner* — Kipp Wallace
(74) *Attorney, Agent, or Firm* — Hope Baldauff, LLC (57) ABSTRACT

According to an embodiment, a method for installing a vapor seal assembly to pass at least one continuous wire through an aperture defined by a bulkhead is provided. The method includes providing a split shell having a threaded, hollow cylindrical extension, providing a split annular gasket, assembling the split shell and the split gasket around the wire, placing the gasket onto the cylindrical extension, and passing the cylindrical extension through the aperture in the bulkhead. The method further includes providing an insert that defines at least one elongated channel for receiving the wire, pressing the wire into the channel, sliding the insert into the cylindrical extension of the shell, assembling a split retainer and a split nut around the wire, engaging the split nut into the retainer, and threading the split nut onto the cylindrical extension.

18 Claims, 8 Drawing Sheets

VAPOR SEAL ASSEMBLY AND METHOD FOR INSTALLING

BACKGROUND

In a variety of different industries, vehicles may include bulkheads or other physical structures. In some cases, wires, cables, or other types of elongated structures may pass through these bulkheads. Passing wires or cables through bulkheads presents several problems. For example, it is possible to provide double-ended connectors on both sides of the bulkhead, terminate the wire run on both sides of the bulkhead, and use the plugs to splice both wire runs together at the bulkhead via the double-ended connector. However, the connectors and plugs themselves contribute additional cost and weight to the overall vehicle, and also introduce the possibility of electrical signal loss or degradation at the connectors and plugs. When scaled across an entire vehicle (e.g., a large passenger aircraft), these added costs and weight may be considerable, particularly when combined with signal loss concerns.

In other scenarios, different sides of the bulkhead may experience pressure differentials. In the context of aircraft or other airborne vehicles, for example, respective bulkheads may define the passenger and crew cabins, which may be pressurized and de-pressurized as the aircraft ascends and descends. Any connectors or other components passing through these bulkheads are typically designed to be hermetically sealed, to protect against these pressure differentials and any related failures that may lead to vapor loss.

SUMMARY

It should be appreciated that this Summary is provided to introduce a selection of concepts in a simplified form that are further described below in the Detailed Description. This Summary is not intended to be used to limit the scope of the claimed subject matter.

According to an embodiment, a method for installing a vapor seal assembly to pass at least one continuous wire through an aperture defined by a bulkhead includes providing a split shell having a threaded, hollow cylindrical extension, providing a split annular gasket, assembling the split shell and the split gasket around the wire, placing the gasket onto the cylindrical extension, passing the cylindrical extension through the aperture in the bulkhead, providing an insert that defines at least one elongated channel for receiving the wire, pressing the wire into the channel, sliding the insert into the cylindrical extension of the shell, assembling a split retainer and a split nut around the wire, engaging the split nut into the retainer, and threading the split nut onto the cylindrical extension In another embodiment, a vapor seal assembly for passing at least one wire through an aperture defined by a bulkhead without terminating the wire at the bulkhead includes a shell including a cylindrical extension for passing through the aperture, wherein the cylindrical extension includes a threaded exterior surface, wherein the shell includes an annular flange attached to one end of the cylindrical extension, wherein the flange includes an outer periphery and defines a plurality of notches along the periphery, and wherein the shell is split approximately half along an axis of the cylindrical extension. The assembly may also include a cylindrical insert sized to fit within the cylindrical extension, wherein the cylindrical insert defines at least one elongated channel along an axis of the cylindrical insert, wherein the cylindrical insert includes an exterior surface, and wherein the cylindrical insert defines a least one slot placing the elongated channel in communication with the exterior surface, wherein the slot is for enabling the wire to pass through the slot to be received within the channel during installation of the vapor seal assembly. An annular gasket has a first flat surface for abutting the bulkhead when the vapor seal assembly is installed, and a second opposing surface for engaging the annular flange of the shell, wherein the gasket includes a plurality of tabs on the opposing surface for positioning within the notches, wherein the gasket is split approximately in half along a diameter of the gasket. A generally annular nut has a threaded interior surface for engaging the threaded exterior surface of the shell, wherein the nut includes a plurality of extensions arranged around an exterior surface of the nut, wherein the nut is split approximately in half along a diameter of the nut. a generally annular retainer defines an aperture for receiving the cylindrical extension of the shell, the retainer including a surface for contacting the bulkhead when the vapor seal is installed, wherein the retainer defines a hollow cavity for receiving the nut and defines a plurality of receptacles for receiving the extensions, wherein the retainer is split approximately in half along a diameter of the retainer.

In yet another embodiment, a vapor seal assembly includes a split shell having a threaded, hollow cylindrical extension and an annular flange attached to one end of the cylindrical extension, wherein the flange includes a first engagement means. A cylindrical insert is sized to fit within the hollow cylindrical extension, and defines at least one elongated channel along an axis of the cylindrical insert, wherein the channel is for receiving a wire passing through an aperture defined within a bulkhead. An annular gasket includes second engagement means for complementary engagement with the first engagement means. A split annular nut includes an interior threaded surface for threading onto the cylindrical extension, and a split retainer that defines a cavity for receiving the nut, wherein the nut and the retainer include respective complementary locking means, for locking the retainer and the nut together when the nut is threaded onto the cylindrical extension.

The features, functions, and advantages discussed herein may be achieved independently in various embodiments of the present description or may be combined in yet other embodiments, further details of which can be seen with reference to the following description and drawings.

DETAILED DESCRIPTION

The following detailed description discloses various tools and techniques related to vapor seal assemblies. This description is most readily understood with reference to the attached drawings, in which like reference numbers may appear in different drawings to refer to similar elements.

Figure 1:
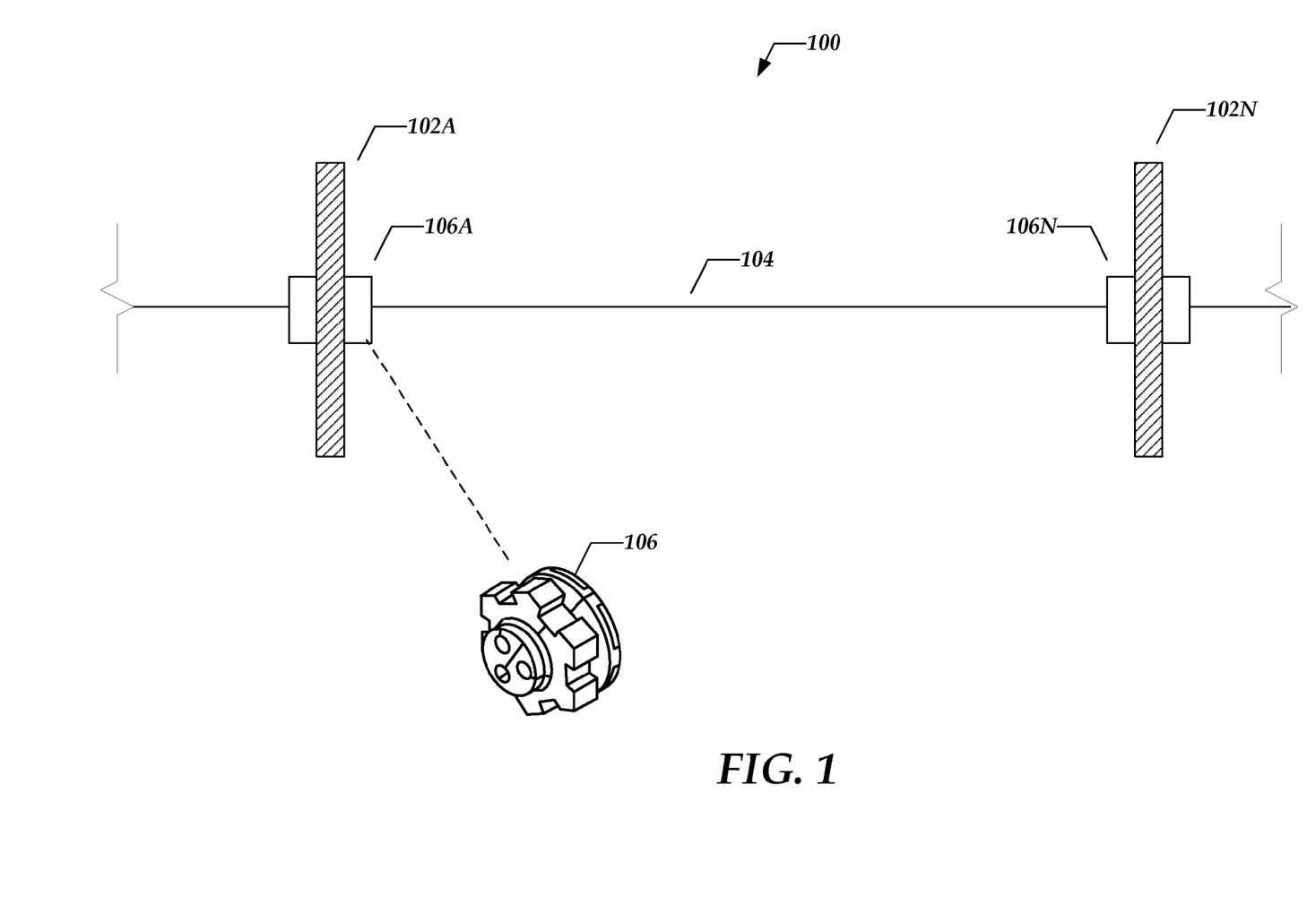
FIG. 1 is a schematic diagram illustrating overall systems or operating environments related to vapor seal assemblies.

FIG. 1 illustrates overall systems or operating environments, denoted generally at 100, related to vapor seal assemblies. Bulkheads or other physical barriers 102a and 102n (collectively, bulkheads 102) may be provided within a vehicle, for structural support or for other reasons. Although FIG. 1 provides two examples of bulkheads 102, it is noted that implementations of this description may accommodate any number of bulkheads. In addition, the vapor seal assemblies described herein may be employed within the automotive, aerospace and aviation, maritime, or other industries. The vapor seal assemblies described herein may be employed within aircraft, spacecraft, automobiles, surface ships and submarines, and the like.

In the course of constructing or maintaining vehicles, wires or cables 104 may pass through the bulkheads 102. It is noted that the terms "wires" or "cables", as used in this description, refer somewhat interchangeably to any elongated conductor, whether or not insulated, and whether or not included with other conductors within a larger cable. The term "wires" may also include wiring bundles or harnesses.

In previous techniques, the wires or cables 104 may terminate on each side of the bulkheads 102, with the bulkhead 102 providing suitable connectors or terminal blocks in which the wires or cables may connect electrically. However, the vapor seal assemblies described herein, shown in block form at 106a and 106n (collectively, vapor seal assemblies 106), may enable the wires 104 to pass uninterrupted or continuously through one or more of the bulkheads 102, without being terminated or cut. in addition, the vapor seal assemblies 106 may enable the wires 104 to pass through the bulkheads without using connectors or terminal blocks, because a single span or run of the wires 104 may pass through the bulkheads uninterrupted and uncut.

FIG. 1 denotes a graphic representation of an example vapor seal assembly at 106. To illustrate the various components of the vapor seal assembly 106 more clearly, the discussion now turns to FIG. 2.

Figure 2:
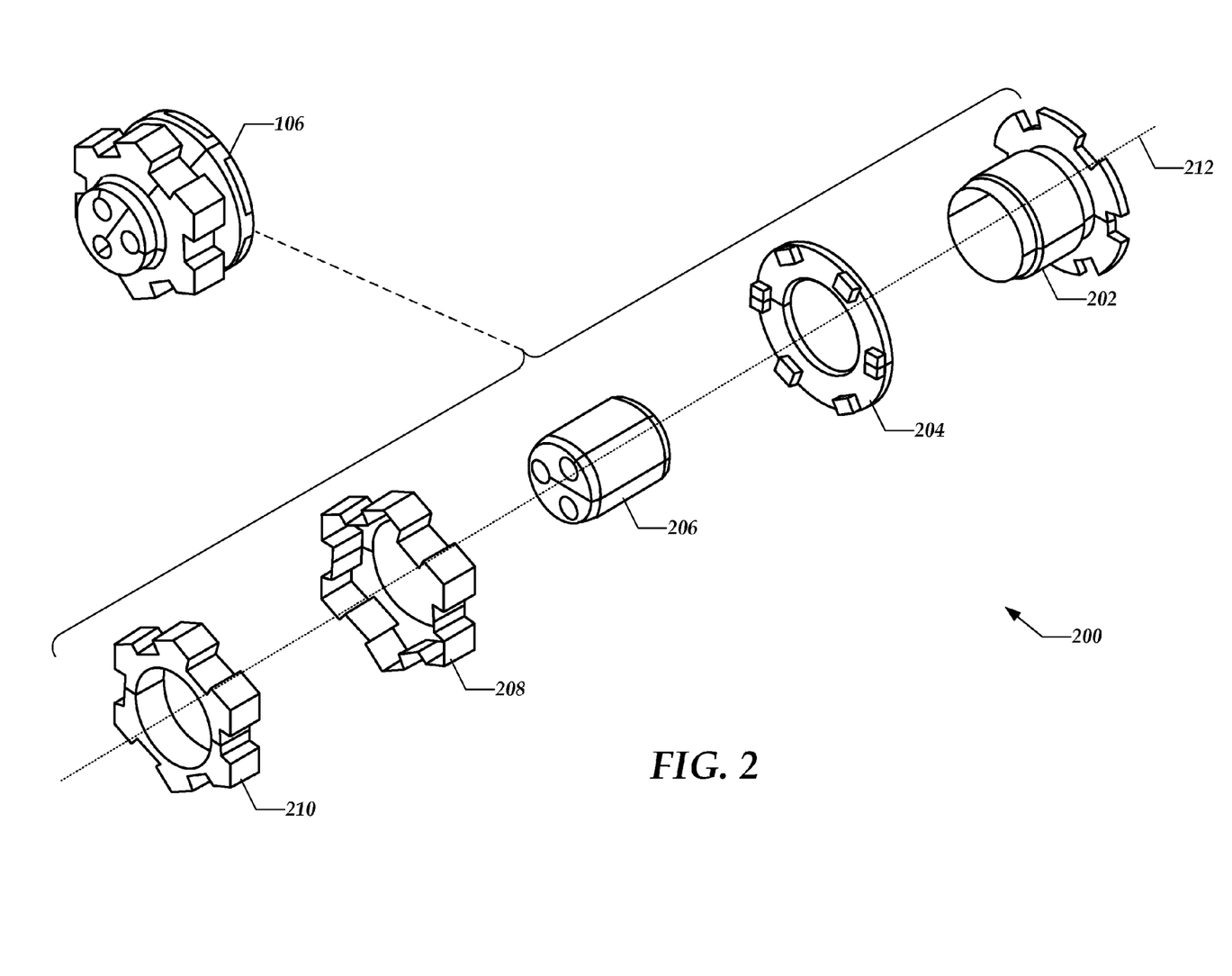
FIG. 2 is an exploded diagram illustrating example components for the vapor seal assembly shown in FIG. 1.

FIG. 2 illustrates example components, denoted generally at 200, for the vapor seal assembly 106 shown in FIG. 1. Regarding FIG. 2 and the other drawing Figures provided herein, it is noted that the elements shown in these drawings are not provided to scale, and may be sized and proportioned as appropriate for different implementations. Accordingly, it is appreciated that the elements as shown in the Figures are sized relative to one another only to facilitate illustration and description, but not to limit possible implementations.

Turning to the components 200 in more detail, the vapor seal assembly 106 may include a shell 202, a gasket 204, an insert 206, a retainer 208, and a nut 210. In example implementations, the shell 202, the retainer 208, and the nut 210 may be manufactured from aluminum, using any suitable production techniques. However, it is noted that various implementations of this description may use other materials to construct the shell, the retainer, and the nut, depending on the circumstances and environmental factors involved in different implementation scenarios. For example, other types of metals may be appropriate, as well as suitably rigid polymeric materials in some cases. In some implementations, the shell, retainer, and nut may be finished with an electrically conducting finish (e.g., ALODYNE™ 1200S, or equivalents).

In example implementations, the gasket 204 and the insert 206 may be manufactured from resilient materials, such as polyurethane (e.g., 40 durometer polyurethane or equivalents). However, it is noted that depending on the circumstances of particular implementations, other materials may be chosen for constructing the gasket 204 and the insert 206, without departing from the scope and spirit of this description.

As described in further detail with the following drawings, the shell, gasket, insert, retainer, and nut may be assembled along a general axis, represented generally by the line 212. To facilitate more detailed illustration and description of the different components 200 of the vapor seal assembly 106, the discussion now turns to FIG. 3 for a description of the shell 202.

Figure 3:
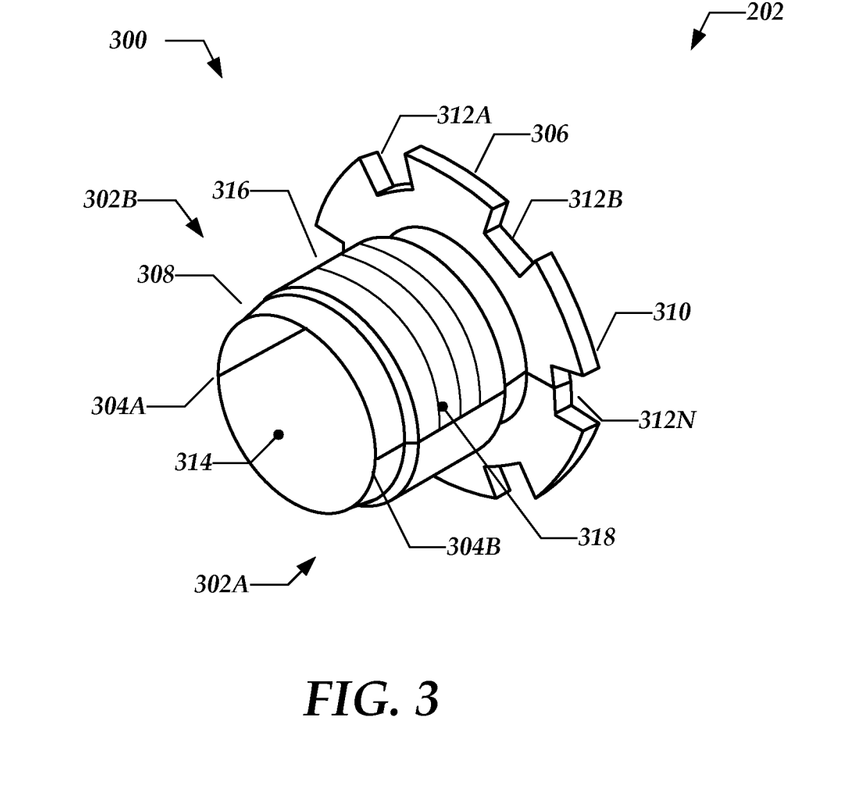
FIG. 3 is a diagram illustrating a perspective view of a shell component of the vapor seal assembly, as shown in FIG. 2.

FIG. 3 illustrates additional features, denoted generally at 300, of the shell 202 shown in FIG. 2. In the example shown in FIG. 3, the shell 202 may be split into two portions 302a and 302b (collectively, shell portions 302), along split lines 304a and 304b (collectively, split lines 304). as described in further detail below, the portions 302 of the shell 202 may be placed on opposite sides of a wire (e.g., 104 in FIG. 1) during assembly of the vapor seal assembly 106, when passing the wire through a bulkhead or other physical barrier or obstruction (e.g., 102 in FIG. 1).

For convenience of illustration only, FIG. 3 illustrates a scenario in which the shell 202 is split approximately in half, such that the shell portions 302a and 302b are approximately equal in size and roughly symmetrical. However, it is noted that implementations of this description may include scenarios in which the shell portions 302 are not perfectly equal in size or symmetrical, without departing from the scope and spirit of this description.

Turning to the shell 202 in more detail, the shell may include a flange portion 306 that is attached to an end of a boss or cylindrical extension 308. The flange portion 306 may be generally annular in shape and configuration, and may include an outer periphery or circumference 310. The flange 306 may include engagement means 312a, 312b, and 312n (collectively, engagement means 312). As described in further detail in subsequent drawings, the engagement means 312 may enable the shell 202 to engage in complementary relation with the gasket 204. In the example shown in FIG. 3, the engagement means 312 may include a plurality of notches defined within the periphery 310 of the flange 306. FIG. 3 provides an example in which the notches are generally rectangular in configuration, but it is noted that notches having other configurations, proportions, and sizes may also be possible. In addition, the number of notches may be varied from that shown in FIG. 3, without departing from the scope and spirit of this description.

Turning to the cylindrical extension 308 in more detail, the cylindrical extension 308 may define an opening or cavity 314, with this opening 314 being sized as appropriate to receive the insert 206. The cylindrical extension 308 may have an outer diameter chosen as appropriate to fit or pass through an aperture defined within the bulkhead into which the vapor seal assembly is installed.

The cylindrical extension 308 may also include threads 316 onto which the nut 210 may thread. The threads 316 may have size and pitch chosen as appropriate for different implementations, with the example provided in FIG. 3 shown only for purposes of illustration and reference.

The cylindrical extension 308 may include a raised portion 318, having slightly greater diameter, as compared to portions 320 and 322. As detailed further below, as the nut 210 threads onto the cylindrical extension 308, with the resilient insert 206 placed in the opening 314, the nut 210 may impart a crimping action on the shell 202 and the insert 206. In some implementations, suitable gaps or tolerances may be designed into the various components of the vapor seal assembly. This crimping action may tend to reduce any gaps within the assembled vapor seal assembly. Afterwards, gap-filling compounds or adhesives may be injected into the vapor seal assembly to seal the assembly hermetically against pressure leaks, vapor leaks, or the like.

Turning to the gap-filling adhesives in more detail, examples of these adhesives may include acrylic adhesives, whether two-part or one-part. Acrylic adhesives may remain flexible after curing, and may be cured using any suitable techniques (e.g., UV light, or the like). The gap-filling adhesives may also include epoxy adhesives, in some scenarios. Adhesives available under the HYSOL® trademark may be suitable.

Having provided a more detailed description of the shell 202 in FIG. 3, the discussion now proceeds to a more detailed description of the insert 206. This description is now provided with FIG. 4.

Figure 4:
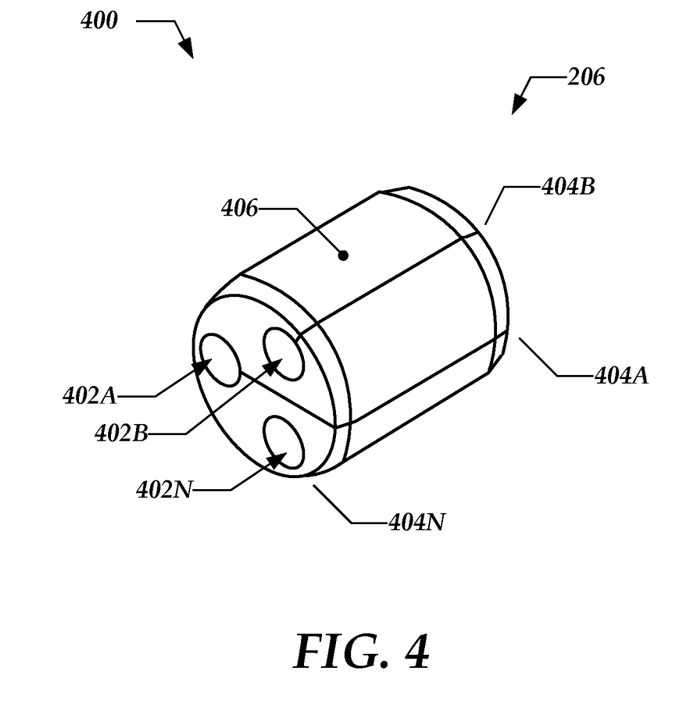
FIG. 4 is a diagram illustrating a perspective view of an insert component of the vapor seal assembly, as shown in FIG. 2.

FIG. 4 illustrates additional features, denoted generally at 400, of the insert 206 shown in FIG. 2. Turning to the insert 206 in more detail, the insert may be generally cylindrical in shape in configuration, and sized as appropriate to fit within the opening 314 of the shell 202, described above in FIG. 3. More specifically, the insert 206 may be sized as appropriate to fit snugly into the opening 314, such that the above-describe crimping action imparted by the nut 210 during assembly may substantially eliminate any gaps occurring between the insert 206 and the shell 202.

FIG. 4 provides an example in which the insert 206 defines three elongated channels 402a, 402b, and 402n (collectively channels 402). In this example, a vapor seal assembly 106 incorporating the example insert 206, as shown in FIG. 4, may allow three separate wires or cables (e.g., 104 in FIG. 1) to pass uninterrupted or continuously through bulkheads or other obstructions (e.g., 102 in FIG. 1). In this scenario, one individual wire or cable 104 may be pressed or inserted into the channels 402. However, it is noted that this configuration is illustrative only, and the inserts 206 may define any number of the channels 402, as appropriate or specified in different implementations scenarios, depending on the number of wires or cables passing through a given aperture within a given bulkhead.

The insert 206 may also define any number of slots 404a, 404b, and 404n (collectively, slots 404), which may correspond respectively to the channels 402a, 402b, and 402n as shown in FIG. 4. These slots 404 may place the channels 402 respectively in communication with an exterior surface 406 of the insert 206. In this manner, the slots 404 may enable the wires or cables to be pressed or inserted through the slots 404 into the channels 402 during assembly and installation of the vapor seal assembly 106.

Having described and illustrated additional details of the insert 206 in FIG. 4, the discussion now turns to a more detailed illustration and description of the gasket 204. This description is now provided with FIG. 5.

Figure 5:
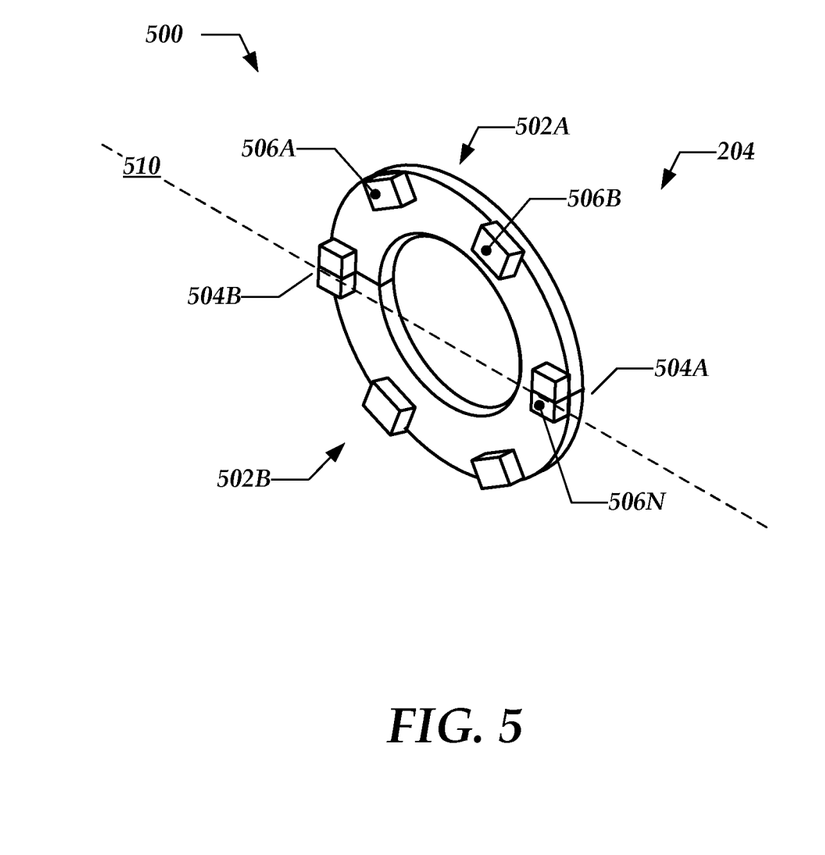
FIG. 5 is a diagram illustrating a perspective view of a gasket component of the vapor seal assembly, as shown in FIG. 2.

FIG. 5 illustrates features, denoted generally at 500, of the gasket 204 shown in FIG. 2. In the example shown in FIG. 5, the gasket 204 may be split into two portions 502a and 502b (collectively, gasket portions 502), along split lines 504a and 504b (collectively, split lines 504). These split lines 504 may lie along a diameter, as shown in FIG. 5. As described in further detail below, the portions 504 of the gasket 204 may be placed on opposite sides of a wire (e.g., 104 in FIG. 1) during assembly of the vapor seal assembly 106, when passing the wire through a bulkhead or other physical barrier or obstruction (e.g., 102 in FIG. 1).

For convenience of illustration only, FIG. 5 illustrates a scenario in which the gasket 204 is split approximately in half along a diameter line, such that the gasket portions 502a and 502b are approximately equal in size and roughly symmetrical. However, it is noted that implementations of this description may include scenarios in which the gasket portions 502 are not identically equal in size or symmetrical, without departing from the scope and spirit of this description.

Turning to the gasket 204 in more detail, the gasket 204 may include engagement means 506a, 506b, and 506n (collectively, engagement means 506). In the example shown in FIG. 5, the engagement means 506 may include a plurality of tabs extending from a surface 508 of the gasket 204. When the vapor seal assembly 106 is assembled, the surface 508 may press against the flange 306 of the shell 202, such that engagement means 506 provided by the gasket 204 mates with the engagement means 312 provided by the shell 202. In the examples shown in FIGS. 3 and 5, the tabs provided by the gasket 204 may insert snugly into the notches provided by the flange 306 of the shell 202. However, it is noted that these examples of the engagement means 506 and 312 are provided only as examples, but not to limit possible implementations. For example, the tabs and notches shown in FIGS. 3 and 5 could be reversed in some implementations, such that the gasket 204 defines a set of notches, and the flange portion of the shell 202 provides a set of tabs.

The two portions of the shell 202 and the gasket 204 may surround the wire or cable, and then be assembled together. For example, turning to the gasket 204 as shown in FIG. 5, the split lines 504 may be arranged along a diameter, visualized at 510. Turning now to the shell 202 as shown in FIG. 3, the split lines 304 may also be arranged along a diameter (omitted from FIG. 3 in the interest of clarity). When the shell 202 and the gasket 204 are assembled around the wire or conductor, the two sets of split lines may be clocked or aligned so that they are generally perpendicular to one another. In this manner, the complementary engagement means 312 and 506 may serve to lock the shell 202 and the gasket 204 together. Illustrative methods of assembly are described in further detail below in connection with FIG. 8.

Having described and illustrated additional details of the gasket 204 in FIG. 5, the discussion now turns to a more detailed illustration and description of the nut 210. This description is now provided with FIG. 6.

Figure 6:
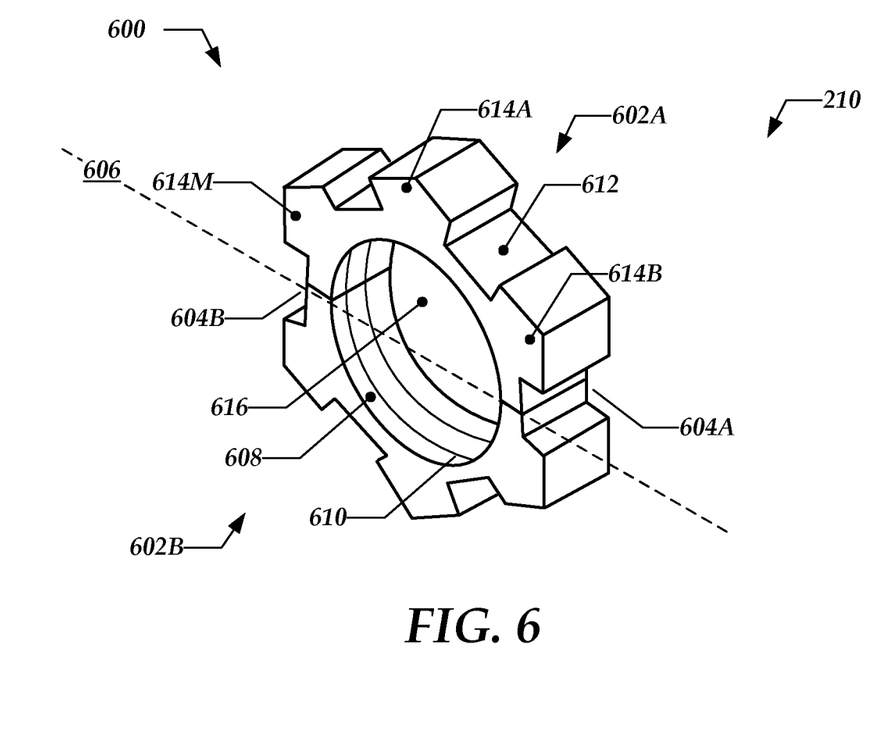
FIG. 6 is a diagram illustrating a perspective view of a nut component of the vapor seal assembly, as shown in FIG. 2.

FIG. 6 illustrates features, denoted generally at 600, of the nut 210 shown in FIG. 2. In the example shown in FIG. 6, the nut 210 may be split into two portions 602a and 602b (collectively, nut portions 602), along split lines 604a and 604b (collectively, split lines 604). In some implementations, these split lines 604 may generally lie along a diameter, as shown in FIG. 6 at 606. As described in further detail below, the portions 602 of the nut 210 may be placed on opposite sides of a wire (e.g., 104 in FIG. 1) during assembly of the vapor seal assembly 106, when passing the wire through a bulkhead or other physical barrier or obstruction (e.g., 102 in FIG. 1).

For convenience of illustration only, FIG. 6 illustrates a scenario in which the nut 210 is split approximately in half along a diameter line, such that the nut portions 602a and 602b are approximately equal in size and roughly symmetrical. However, it is noted that implementations of this description may include scenarios in which the nut portions 602 are not identically equal in size or symmetrical, without departing from the scope and spirit of this description.

As shown in FIG. 6, the nut 210 may include an interior surface 608 or contacting the cylindrical extension 308 provided by the shell 202. More specifically, the nut 210 may include threads 610 defined within the interior surface 608, for threading on to mating threads 316 provided by the cylindrical extension 308 during installation and assembly of the vapor seal. In general, the thread 610 may be compatible with the size and pitch of the threads 316.

The nut 210 may also include an exterior surface 612, with this exterior surface 612 providing suitable locking means 614a, 614b, and 614m (collectively, locking means 614). As described in further detail below with FIG. 7, the locking means 614 may lock or engage with complementary means provided by the retainer 208. In the example shown in FIG. 6, however, the locking means 614 may include a plurality of individual, generally triangular extensions, which may project from the exterior surface 612. In general, the locking means 614 may take the form of tooth-like or other similar projections, extending from the exterior surface 612.

The six individual extensions shown in FIG. 6 are provided only for example. Implementations of this description may include any suitable number of individual locking means without departing from the scope and spirit of this description.

The nut 210 may also define an aperture 616, sized as appropriate to receive the cylindrical extension 308 provided by the insert 202. As described above in connection with FIG. 3, as the assembled nut 210 is threaded onto the cylindrical extension 308 and tightened, this tightening action may impart a crimping effect on to the insert 206 as placed within the cylindrical extension 308. This crimping effect may serve to eliminate gaps appearing between the various components of the vapor seal assembly 106, as well as any gaps between the seal 206 and the wires or cables passing through the bulkhead. In this manner, the fully-assembled vapor seal assembly 106 may seal against pressure differentials existing on opposite sides of the bulkhead.

Having described and illustrated additional details of the nut 210 in FIG. 6, the discussion now turns to a more detailed illustration and description of the retainer 208. This description is now provided with FIG. 7.

Figure 7:
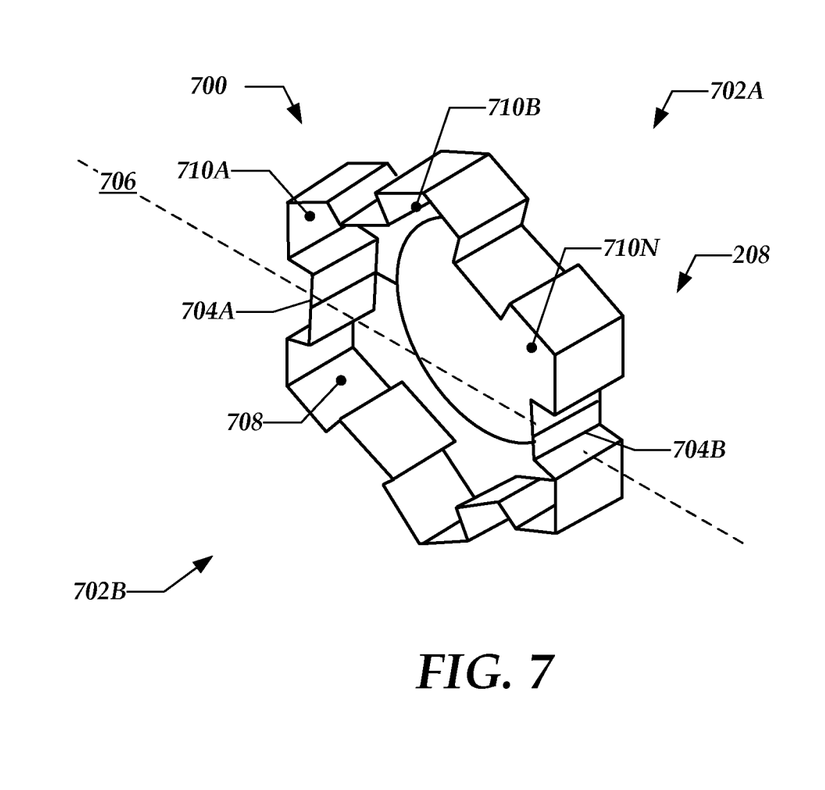
FIG. 7 is a diagram illustrating a perspective view of a retainer component of the vapor seal assembly, as shown in FIG. 2.

FIG. 7 illustrates features, denoted generally at 700, of the retainer 208 shown in FIG. 2. In the example shown in FIG. 7, the retainer 208 may be split into two portions 702a and 702b (collectively, retainer portions 702), along split lines 704a and 704b (collectively, split lines 704). In some implementations, these split lines 704 may generally lie along a diameter, as shown in FIG. 7 at 706. As described in further detail below, the portions 702 of the retainer 208 may be placed on opposite sides of a wire (e.g., 104 in FIG. 1) during assembly of the vapor seal assembly 106, when passing the wire through a bulkhead or other physical barrier or obstruction (e.g., 102 in FIG. 1).

For convenience of illustration only, FIG. 7 illustrates a scenario in which the retainer 208 is split approximately in half along the diameter line 706, such that the retainer portions 702a and 702b are approximately equal in size and roughly symmetrical. However, it is noted that implementations of this description may include scenarios in which the retainer portions 702 are not identically equal in size or symmetrical, without departing from the scope and spirit of this description.

Turning to the retainer 208 in more detail, the assembled retainer may define an internal opening or cavity 708 for receiving the nut 210. In general, the retainer 208 may be sized slightly larger than the nut 210, such that the nut 210 may fit within the retainer 208. The retainer 208 may also include locking means 710a, 710b, and 710n (collectively, locking means 710). The locking means 710 provided by the retainer 208 may be complementary to the locking means 614 provided by the nut 210. in the examples shown in FIGS. 6 and 7, the nut 210 may provide locking means 614 in the form of male projections or extensions, while the retainer 208 may provide locking means 710 in the form of receptacles sized and spaced to receive these projections or extensions.

As described above with the shell 202 and the gasket 204 in connection with FIGS. 3 and 5, the two portions of the retainer 208 and the nut 210 may surround the wire or cable, and then be assembled together. For example, turning to the nut 210 as shown in FIG. 6, the split lines 604 may be arranged along the diameter 606. Turning now to the retainer 208 as shown in FIG. 7, the split lines 704 may also be arranged along the diameter 706. When the nut 210 is assembled into the retainer 208 and placed around the wire or conductor, the two sets of split lines may be clocked or aligned so that they are generally perpendicular to one another. In this manner, the complementary locking means 614 and 710 may serve to lock the retainer 208 and nut 210 together. Illustrative methods of assembly are described in further detail below in connection with FIG. 8.

The retainer 208 may define an aperture 710. This aperture may be sized as appropriate for receiving the cylindrical extension 308 of the shell 202, when the assembled retainer 208 and nut 210 are threaded onto the cylindrical extension 308.

Having described and illustrated additional details of the retainer 208 in FIG. 7, the discussion now turns to a description of techniques for assembling and installing the vapor seal assembly 106. This description is now provided with FIG. 8.

Figure 8:
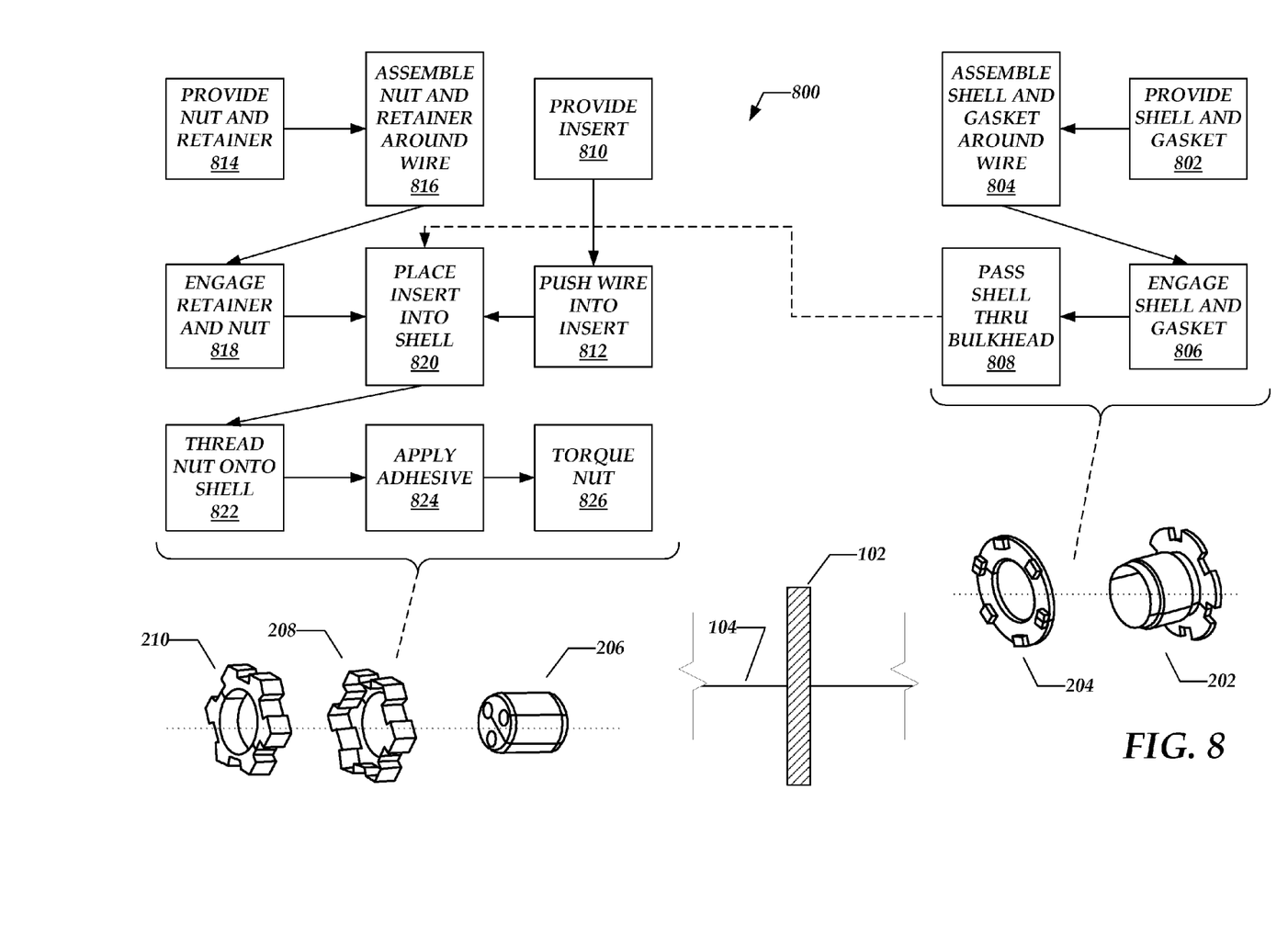
FIG. 8 is a flow diagram illustrating techniques for assembling and installing the vapor seal assembly.

FIG. 8 illustrates techniques, denoted generally at 800, for assembling and installing the vapor seal assembly 106. For ease of reference, FIG. 8 carries forward an example bulkhead or other physical barrier 102, through which a wire or cable 104 may pass continuously and without termination or interruption, using the vapor seal assembly 106 described above.

FIG. 8 carries forward the shell 202 and the gasket 204, which may be installed from one side of the bulkhead 102, and also carries forward the insert 206, the retainer 208, and the nut 210, which may be installed from the other side of the bulkhead 102. In illustrative installation scenarios, certain operations involved with installing and assembling the vapor seal assembly 106 may be performed on different sides of the bulkhead 102. Accordingly, FIG. 8 illustrates these operations as being performed on different sides of the bulkhead to facilitate this description, but not to limit possible implementations.

Turning to the techniques 800 in more detail, on one side of the bulkhead 102, block 802 represents providing a shell and gasket, such as those illustrated and described above. For example, FIG. 8 carries forward examples of the shell and gasket, denoted at 202 and 204, respectively.

Block 804 represents assembling the portions of the shell and gasket around the wire. Block 804 may also include clocking, aligning, or orienting the split lines of the shell and the gasket, such that these split lines of the shell are generally perpendicular to the split lines of the gasket.

Block 806 represents engaging the shell 202 with the gasket 204. More specifically, block 806 may include engaging the complementary means 506 and 312, as provided respectively by the gasket 204 and the shell 202.

Block 808 represents passing the assembled shell and gasket assembly through an aperture in the bulkhead 102 or other physical obstruction, with the wire or cable 104 already passing through this aperture. More specifically, block 808 may include passing the cylindrical extension 308 through the aperture in the bulkhead 102, so that other components of the vapor seal assembly may be installed from the opposite side of the bulkhead.

Block 810 represents providing an insert, such as the insert 206 shown and described in the previous drawings. In turn, block 812 represents pressing or pressing the wire or cable into the insert 206. For example, referring briefly back to FIG. 4, block 812 may include inserting the wire or cable through the slots 404 into the channels 402. In scenarios in which multiple wires or cables pass through a given aperture in the bulkhead 102, block 812 may be repeated as appropriate to insert these multiple wires. It is noted that blocks 810 and 812 may be performed on the same side of the bulkhead 102 as were blocks 802-808, with the example shown in FIG. 8 provided only to facilitate this description.

Block 814 represents providing a nut and retainer, such as the nut 210 and the retainer 208 carried forward into FIG. 8, and described in detail above. In turn, block 816 represents assembling the portions of the nut and retainer around the wire 104. Block 816 may include clocking, aligning, or orienting the split lines of the nut and retainer, so that the split lines of the nut are approximately perpendicular to the split lines of the retainer.

Block 818 represents engaging the retainer and nut. More specifically, block 818 may include placing the nut 210 into a cavity or opening defined within the retainer 208.

Block 820 represents placing the insert into the shell 202. More specifically, referring briefly back to FIG. 3, block 820 may include sliding the insert 206 into the opening 314 in the cylindrical extension 308. FIG. 8 illustrates scenarios in which the insert 206 is assembled from the same side of the bulkhead as are the retainer 208 and the nut 210. In these scenarios, block 820 may include placing the insert 206 into the cylindrical extension, after the shell is inserted through the bulkhead 102. However, as noted above, the insert 206 may also be assembled from the other side of the bulkhead, along with the shell 202 and the gasket 204. In these latter installation scenarios, block 820 may include placing the insert 206 into the cylindrical extension, before the shell is inserted through the bulkhead 102.

Block 822 represents threading the assembled nut and retainer onto the cylindrical extension of the shell 202. In some installations, dry-film lubricant may be applied to the threads during assembly.

In some implementations, block 824 represents applying a suitable gap-filling adhesive to the vapor seal assembly at any convenient point during the installation techniques shown in FIG. 8. Block 824 also represents allowing the adhesive to cure in any manner appropriate for the particular adhesive chosen. In turn, block 826 represents torquing the nut 210 to a predefined torque rating, specified as appropriate for particular implementations.

It is noted that the actions illustrated in FIG. 8 are presented in the order shown only to facilitate the present description, but not to limit possible implementations. More specifically, implementations of this description may perform the presented actions, or other actions as well, in orders other than those shown in FIG. 8 without departing from the scope and spirit of this description.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A method for installing a vapor seal assembly to pass at least one continuous wire through an aperture defined by a bulkhead, the method comprising:
   providing a split shell having a hollow cylindrical extension and an annular flange, wherein the cylindrical extension comprises a threaded exterior surface having a raised portion and the annular flange comprises a plurality of notches along a periphery of the flange;
   providing a split annular gasket having a flat surface and an opposing surface that comprises a plurality of tabs;
   assembling the split shell and the split gasket around the wire;
   placing the gasket onto the cylindrical extension such that an interior surface of the gasket engages an exterior surface of the cylindrical extension and such that the plurality of tabs engages the plurality of notches so as to lock the split shell and the gasket together;
   passing the cylindrical extension through the aperture in the bulkhead;
   providing a resilient insert that defines at least one elongated channel for receiving the wire;
   pressing the wire into the channel;
   sliding the resilient insert into the cylindrical extension of the shell;
   assembling a split retainer and a split nut around the wire;
   engaging the split nut into the retainer such that the split nut and the retainer are locked together;
   threading the split nut and retainer onto the threaded exterior surface of the cylindrical extension such that an interior surface of the split nut engages the raised portion; and
   tightening the split nut to impart a crimping effect on the resilient insert and to eliminate gaps within the assembly.

2. The method of claim 1, wherein providing the resilient insert includes providing an insert that defines at least one slot placing the channel in communication with an exterior surface of the insert, and wherein pressing the wire into the channel includes pressing the wire through the slot into the channel.

3. The method of claim 1, wherein the shell is associated with a plurality of first split lines, wherein the gasket is associated with a plurality of second split lines, and further comprising aligning the first split lines with the second split lines.

4. The method of claim 3, wherein aligning the split lines includes rotating the shell and the gasket relative to one another, so that the first split lines are approximately perpendicular to the second split lines.

5. The method of claim 1, wherein the retainer is associated with a plurality of first split lines, wherein the nut is associated with a plurality of second split lines, and further comprising aligning the first split lines with the second split lines.

6. The method of claim 5, wherein aligning the split lines includes rotating the nut and the retainer relative to one another, so that the first split lines are approximately perpendicular to the second split lines.

7. The method of claim 1, further comprising repeating the method to install at least a second vapor seal assembly to pass the wire through an aperture defined by at least a second bulkhead, without terminating the wire at the second bulkhead.

8. The method of claim 1, further comprising applying a dry-film lubricant to the split nut and cylindrical extension.

9. A vapor seal assembly for passing at least one wire through an aperture defined by a bulkhead without terminating the wire at the bulkhead, the vapor seal assembly comprising:
- a shell including a cylindrical extension for passing through the aperture, wherein the cylindrical extension includes a threaded exterior surface having a raised portion, wherein the shell includes an annular flange attached to one end of the cylindrical extension, wherein the flange includes an outer periphery and defines a plurality of notches along the periphery, and wherein the shell is split around a central axis such that the shell may be assembled around the wire running parallel to the central axis;
- a cylindrical insert sized to fit within the cylindrical extension, wherein the cylindrical insert defines at least one elongated channel along the central axis, wherein the cylindrical insert includes an exterior surface, and wherein the cylindrical insert defines a least one slot placing the elongated channel in communication with the exterior surface, wherein the slot is for enabling the wire to pass through the slot to be received within the channel during installation of the vapor seal assembly;
- an annular gasket having a first flat surface for abutting the bulkhead when the vapor seal assembly is installed, and a second opposing surface for engaging the annular flange of the shell, wherein the gasket includes a plurality of tabs on the second opposing surface for positioning within the notches, and wherein the gasket is split around the central axis;
- a generally annular nut having a threaded interior surface for engaging the threaded exterior surface of the cylindrical extension and the raised portion and sized to impart a crimping force on the cylindrical insert, wherein the nut includes a plurality of extensions arranged around an outer annular circumferences of the nut, and wherein the nut is split around the central axis; and
- a generally annular retainer defining an aperture for receiving the cylindrical extension of the shell, the retainer including a surface for contacting the bulkhead when the vapor seal is installed, wherein the retainer defines a hollow cavity for receiving the nut and comprises a plurality of receptacles for receiving the extensions such that when the plurality of extensions of the nut engage the plurality receptacles of the retainer, the nut and the retainer are locked together, and wherein the retainer is split around the central axis.

10. The vapor seal assembly of claim 9, wherein the plurality of extensions of the nut are generally triangularly shaped, and wherein the plurality of receptacles are similarly triangularly shaped to receive the plurality of extensions.

11. The vapor seal assembly of claim 9, further comprising a gap-filling adhesive applied to the vapor seal assembly during installation.

12. A vapor seal assembly comprising:
- a split shell having a threaded, hollow cylindrical extension with a raised portion and an annular flange attached to one end of the cylindrical extension, wherein the flange includes a first engagement means;
- a cylindrical insert sized to fit within the hollow cylindrical extension, and defining at least one elongated channel along an axis of the cylindrical insert, wherein the channel is for receiving a wire passing through an aperture defined within a bulkhead;
- an annular gasket including second engagement means for complementary engagement with the first engagement means;
- a split annular nut having an interior threaded surface for threading onto the cylindrical extension and engaging the raised portion and sized to impart a crimping force on the cylindrical insert; and
- a split retainer that defines a cavity for receiving the nut, wherein the nut and the retainer include respective complementary locking means for locking the retainer and the nut together when the nut is engaged with the retainer.

13. The vapor seal assembly of claim 12, wherein the first engagement means includes a plurality of notches defined along a periphery of the flange, and wherein the second engagement means includes a plurality of tabs extending from one surface of the gasket, wherein the tabs are sized and spaced to engage the notches when the gasket is assembled onto the shell.

14. The vapor seal assembly of claim 12, wherein the first engagement means includes a plurality of tabs extending from the flange toward the cylindrical extension, and wherein the second engagement means includes a plurality of notches defined by the gasket, wherein the tabs are sized and spaced to engage the notches when the gasket is assembled onto the shell.

15. The vapor seal assembly of claim 12, wherein the complementary locking means include a plurality of triangular portions extending from an outer annular circumference of the nut, and include a plurality of receptacles defined by the retainer for receiving the triangular portions when the nut is engaged with the retainer.

16. The vapor seal assembly of claim 12, wherein the nut and the retainer define respective split lines, and wherein the split lines of the nut are approximately perpendicular to the split lines of the retainer when the vapor seal assembly is installed.

17. The vapor seal assembly of claim 12, wherein the shell and the gasket define respective split lines, and wherein the split lines of the shell are approximately perpendicular to the split lines of the gasket when the vapor seal assembly is installed.

18. The vapor seal assembly of claim 12, wherein the shell, the retainer, and the nut are finished with an electrically conducting finish.

* * * * *